United States Patent
Takahashi

(10) Patent No.: US 9,340,046 B2
(45) Date of Patent: May 17, 2016

(54) DRIVE DEVICE AND INK-JET PRINTER

(71) Applicant: BROTHER KOGYO KABUSHIKI KAISHA, Nagoya-shi, Aichi-ken (JP)

(72) Inventor: Eisuke Takahashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/867,771

(22) Filed: Sep. 28, 2015

(65) Prior Publication Data

US 2016/0089911 A1 Mar. 31, 2016

(30) Foreign Application Priority Data

Sep. 30, 2014 (JP) ................. 2014-201112

(51) Int. Cl.
*B41J 13/00* (2006.01)
*F16H 1/22* (2006.01)

(52) U.S. Cl.
CPC ............... *B41J 13/0009* (2013.01); *F16H 1/22* (2013.01)

(58) Field of Classification Search
CPC .......... B41J 13/0009; B41J 2/01; F16H 1/22; F16H 37/0833; F16H 1/46; F16H 37/065; B65H 2403/41; B65H 2405/11172; B65H 3/0669; B65H 3/5261; B65H 7/18; Y10T 29/49464
See application file for complete search history.

(56) References Cited

U.S. PATENT DOCUMENTS 8,430,393 B2 * 4/2013 Matsushima .......... B65H 1/266
271/10.01
2008/0157460 A1 7/2008 Izuchi et al.

FOREIGN PATENT DOCUMENTS

JP 2008-162736 A 7/2008

* cited by examiner

*Primary Examiner* — Thinh Nguyen
(74) *Attorney, Agent, or Firm* — Merchant & Gould P.C.

(57) ABSTRACT

A drive device includes: connection gears connected to driving objects; a movable gear movable between the connection gears; a drive source for rotating the movable gear; and at least one estimator each provided for a corresponding one of at least one of the connection gears and configured to: estimate a reaction-force estimate value, as an estimate value of a reaction force acting in a power transmission system from the drive source to the driving object, based on control input, control output, and a model of the power transmission system; and output the reaction-force estimate value. The model is configured such that the reaction-force estimate value falls within a set range in a state in which the movable gear is meshed with the connection gear. A controller detects mesh and/or separation between the movable gear and the at least one connection gear based on the reaction-force estimate value.

11 Claims, 9 Drawing Sheets

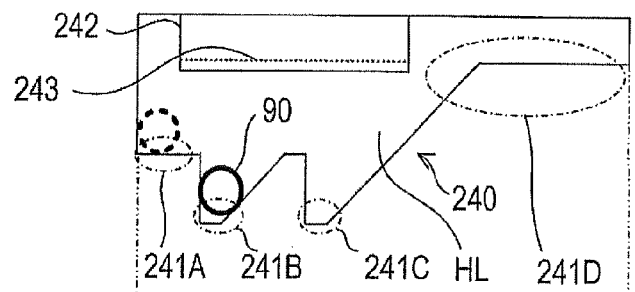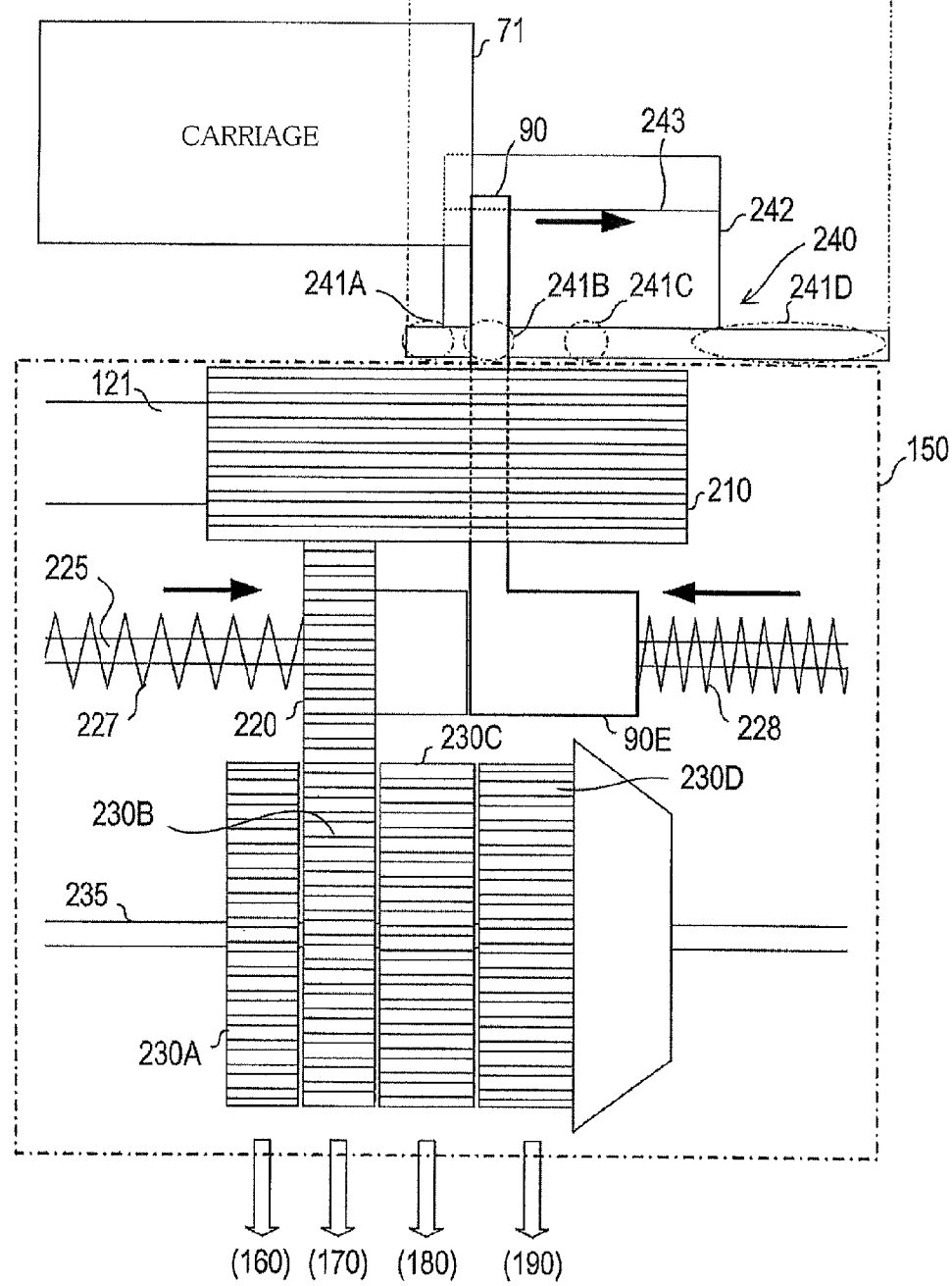

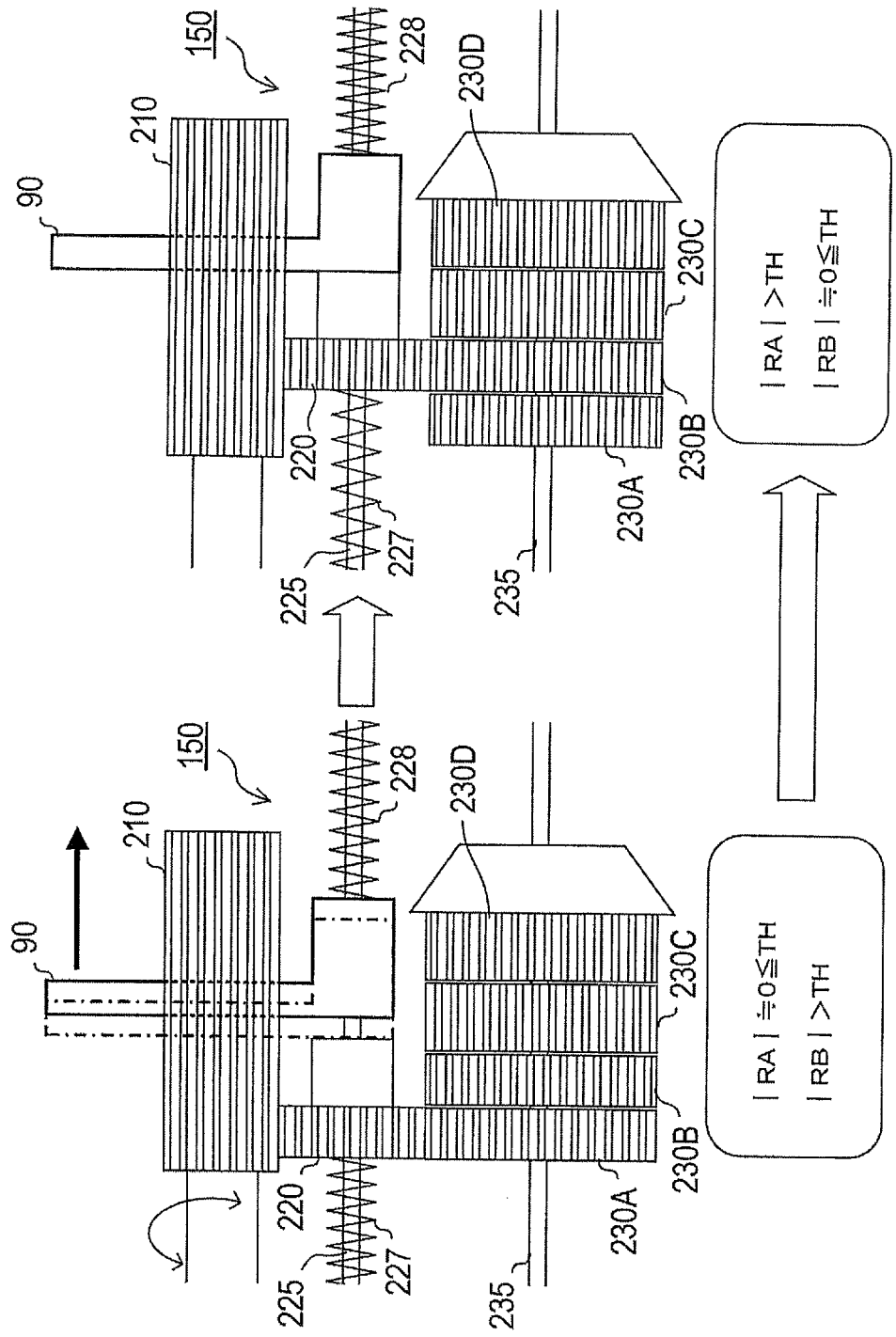

TARGET VELOCITY Vr

TIME t

VELOCITY V

AVERAGE CALCULATION

TIME t

CURRENT COMMAND VALUE U

AVERAGE CALCULATION

TIME t

CURRENT COMMAND VALUE U

VELOCITY V

DRIVE DEVICE AND INK-JET PRINTER

CROSS REFERENCE TO RELATED APPLICATION

The present application claims priority from Japanese Patent Application No. 2014-201112, which was filed on Sep. 30, 2014, the disclosure of which is herein incorporated by reference in its entirety.

BACKGROUND

1. Technical Field

The following disclosure relates to a drive device and an ink-jet printer.

2. Description of the Related Art

There is known a sheet conveying device configured to transmit power from a single drive source to a plurality of rollers. This sheet conveying device includes a conveying roller for conveying a sheet, a drive gear provided on one end of the conveying roller, a switching gear, and a plurality of transmission gears.

The drive gear is rotated together with the conveying roller. The switching gear is movable in parallel with a rotation axis of the drive gear and is always meshed with the drive gear in an area in which the switching gear is movable. The plurality of transmission gears are rotatable around a common rotation axis parallel with the rotation axis of the switching gear and are aligned coaxially. Each of the transmission gears transmits power to a corresponding device to be driven, in a state in which the transmission gear is meshed with the switching gear.

The movement of the switching gear switches which transmission gear is meshed with the switching gear among the plurality of transmission gears. This sheet conveying device moves the switching gear and thereby changes a destination of the power transmitted from the drive gear, to drive a corresponding device via the transmission gear meshed with the switching gear. The sheet conveying device is capable of executing a processing of rotating the switching gear in forward and reverse rotational directions alternately by the same amount via the drive gear. The sheet conveying device moves the switching gear in its axial direction by repeating this processing a predetermined number of times in a state in which the switching gear receives power in a direction in which the switching gear is to be moved.

SUMMARY

Incidentally, conventional devices cannot detect a state in which the switching gear is meshed with a target transmission gear after being moved from another transmission gear with which the switching gear is previously meshed. Thus, the conventional devices redundantly repeat the above-described processing the predetermined number of times which is considered to be enough for the switching gear to reliably move to the target transmission gear.

In this conventional technique, however, the above-described processing may be kept executed repeatedly even when the switching gear is meshed with the target transmission gear. Thus, a redundant time is required for completion of a gear switching processing (control).

Accordingly, an aspect of the disclosure relates to a technique capable of detecting at least one of mesh and separation between gears in a drive device which switches mesh of gears to transmit power from a single drive source selectively to one of a plurality of driving objects.

In one aspect of the disclosure, a drive device includes: a plurality of connection gears each connected to a corresponding one of a plurality of driving objects to drive the corresponding one of the plurality of driving objects; a movable gear movable between the plurality of connection gears and meshable with each of the plurality of connection gears; a single drive source configured to rotate the movable gear to rotate one of the plurality of connection gears which is in meshing engagement with the movable gear; a controller configured to control the drive source; and at least one estimator each provided for a corresponding one of at least one connection gear of the plurality of connection gears and configured to: estimate a reaction-force estimate value, as an estimate value of a reaction force acting in a power transmission system from the drive source to a corresponding one of the plurality of driving objects, based on a frictional-force estimate value acting in the power transmission system and based on (i) control input supplied from the controller to the drive source, (ii) control output corresponding to the control input, and (iii) a model of the power transmission system, the model indicating a relationship between the control output and the control input; and output the estimated reaction-force estimate value to the controller. The model set for each of the at least one estimator is configured such that the reaction-force estimate value falls within a set range in a state in which the movable gear is in meshing engagement with a corresponding one of the plurality of connection gears. The controller is configured to detect at least one of mesh and separation between the movable gear and each of the at least one connection gear based on the reaction-force estimate value obtained by a corresponding one of the at least one estimator.

In one aspect of the disclosure, an ink-jet printer includes the drive device. The ink-jet printer includes a plurality of mechanisms as the plurality of driving objects. The drive device is configured to drive each of the plurality of mechanisms to perform a corresponding one of operations different from each other. The plurality of connection gears are respectively connected to the plurality of mechanisms. The drive device is configured to drive each of the plurality of mechanisms by transmitting power, which is generated by the single drive source shared by the plurality of mechanisms, to one mechanism of the plurality of mechanisms via (i) one connection gear of the plurality of connection gears which corresponds to the one mechanism and (ii) the movable gear held in meshing engagement with the connection gear. The controller is configured to detect mesh between the one connection gear and the movable gear based on the reaction-force estimate value obtained by one of the at least one estimator which corresponds to the one mechanism.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 3A is a top view schematically illustrating a construction of a lever holder, and FIG. 3B is a schematic side view illustrating a construction of a transmission mechanism;

FIG. 4 is a view illustrating operations of a switching lever and a movable gear during switching of gear;

DETAILED DESCRIPTION OF THE EMBODIMENTS

Figure 1:
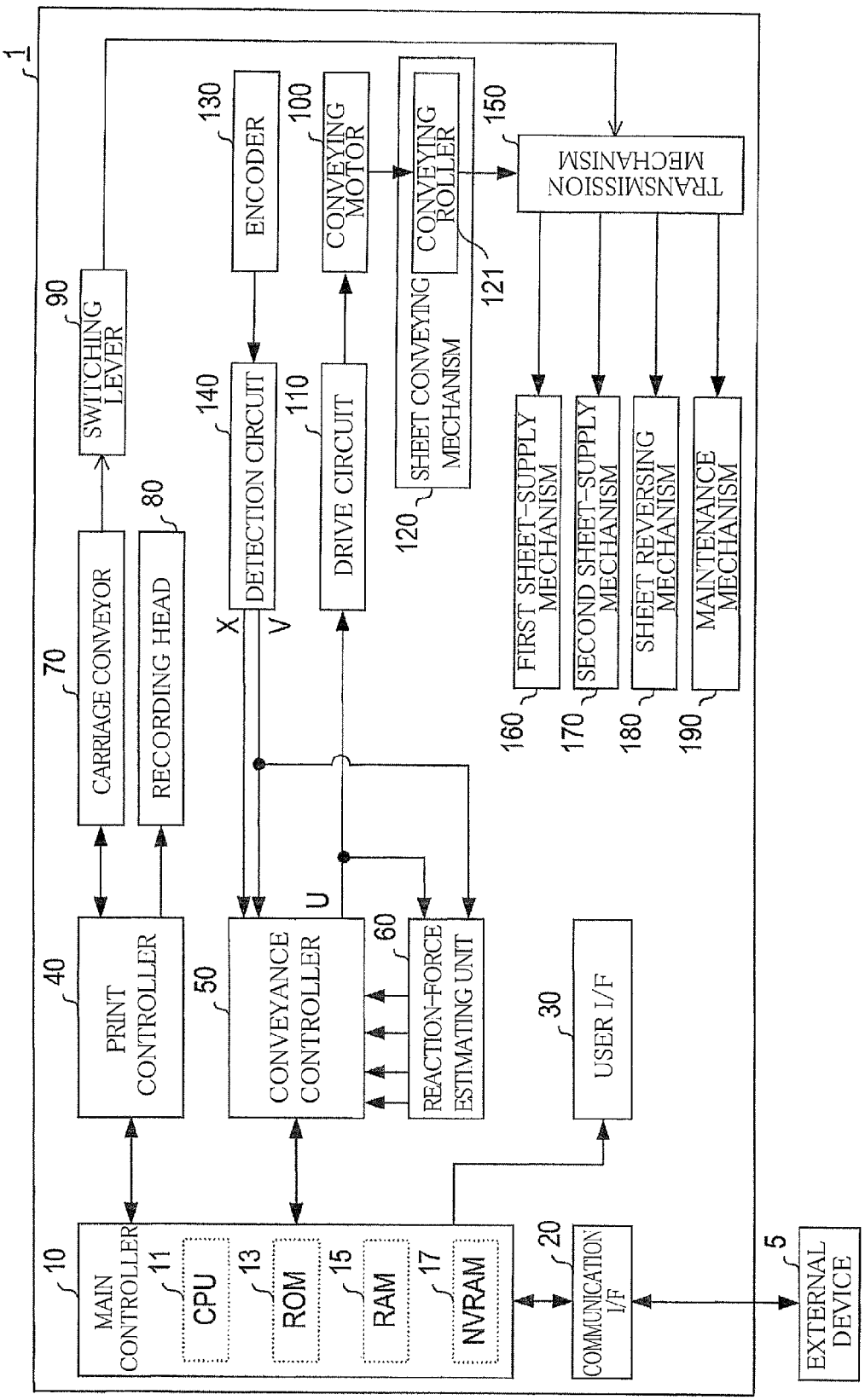
FIG. 1 is a block diagram illustrating a configuration of an image forming system.

Hereinafter, there will be described one embodiment by reference to the drawings. An image forming system 1 according to the present embodiment illustrated in FIG. 1 is configured in the form of an ink-jet printer. This image forming system 1 includes a main controller 10, a communication interface 20, a user interface 30, a print controller 40, a conveyance controller 50, and a reaction-force estimating unit 60.

The image forming system 1 further includes a carriage conveyor 70, a recording head 80, a switching lever 90, a conveying motor 100, a drive circuit 110, a sheet conveying mechanism 120, a rotary encoder 130, a detection circuit 140, a transmission mechanism 150, a first sheet-supply mechanism 160, a second sheet-supply mechanism 170, a sheet reversing mechanism 180, and a maintenance mechanism 190.

The main controller 10 includes a CPU 11, a ROM 13, a RAM 15, and an NVRAM 17. The ROM 13 stores various programs. The CPU 11 executes processings according to these programs stored in the ROM 13. The RAM 15 is used as a working area when the CPU 11 executes the processings. The NVRAM 17 is an electrically rewritable non-transitory memory which stores data required to be kept even after the image forming system 1 is turned off.

The CPU 11 executes the processings according to these programs stored in the ROM 13 to control devices and components of the image forming system 1, so as to achieve functions required as the ink-jet printer. In the following explanation, it is assumed that the main controller 10 executes the processings to be executed by the CPU 11. The communication interface 20 is capable of carrying out two-way communication with an external device 5 such as a personal computer. Examples of the communication interface 20 include a USB interface and a LAN interface.

Upon receiving image data for printing from the external device 5 via the communication interface 20, the main controller 10 instructs the print controller 40 and the conveyance controller 50 to form an image on a sheet Q based on the received image data. Upon receiving an error notification from at least one of the print controller 40 and the conveyance controller 50 for indicating occurrence of an error, the main controller 10 executes an error notification processing for controlling the user interface 30 to notify a user of the occurrence of the error. In the error notification processing, for example, the main controller 10 controls the user interface 30 to display an alert message or output an alert sound.

The user interface 30 includes a display such as a liquid crystal display, a speaker, and an input unit operable by the user. Examples of the input unit include a touchscreen and key switchs.

According to the instruction received from the main controller 10, the print controller 40 controls movement of a carriage 71 (see FIG. 2) on which the recording head 80 is mounted and controls the recording head 80 to eject ink droplets. The print controller 40 controls the carriage conveyor 70 to control movement of the carriage 71 in a main scanning direction. The main scanning direction is perpendicular to a sub-scanning direction that coincides with a direction in which the sheet Q is conveyed.

Figure 2:
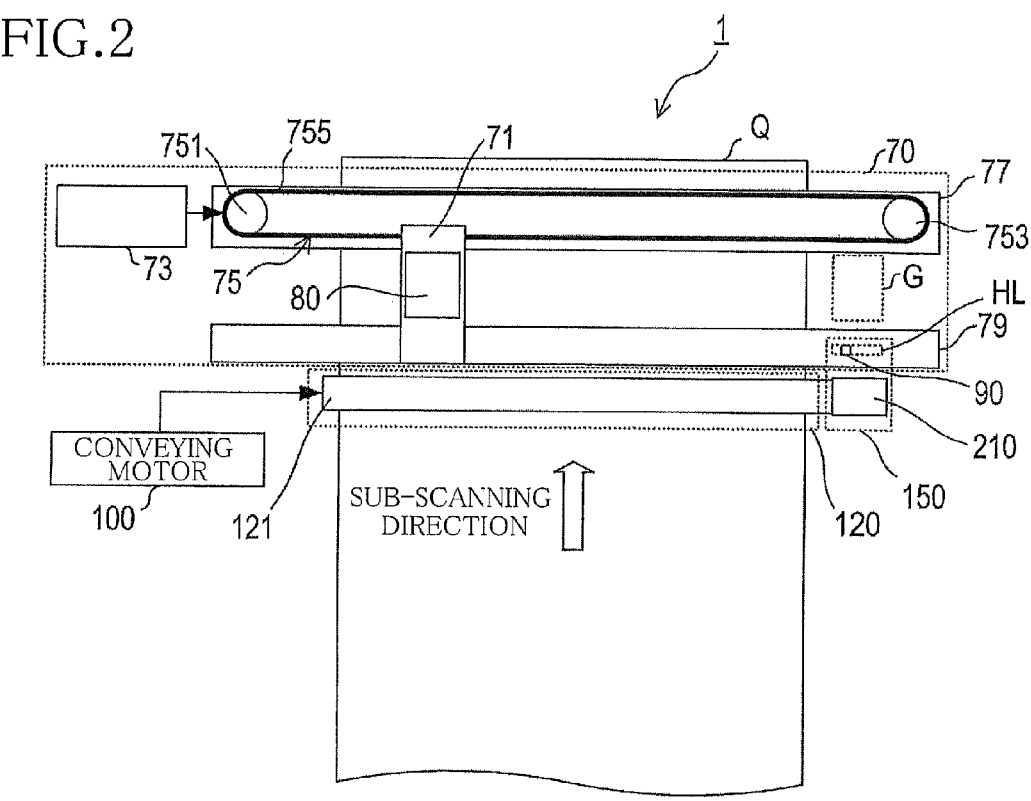
FIG. 2 is a view for explaining a carriage and a mechanical structure for conveying a sheet.

As illustrated in FIG. 2, the carriage conveyor 70 includes the carriage 71, a motor 73, a belt mechanism 75, and guide rails 77, 79. The carriage conveyor 70 further includes a linear encoder, not shown. The motor 73 is controlled by the print controller 40. The linear encoder is configured such that the print controller 40 can detect a position of the carriage 71 in the main scanning direction.

The print controller 40 controls the motor 73 based on an output received from the linear encoder to control the movement of the carriage 71 in the main scanning direction. Also, in accordance with the movement of the carriage 71, the print controller 40 controls the recording head 80 to eject ink droplets toward desired positions on the sheet Q.

The belt mechanism 75 includes: a drive pulley 751 and a driven pulley 753 arranged in the main scanning direction; and a belt 755 looped over the drive pulley 751 and the driven pulley 753. The carriage 71 is fixed to the belt 755. In the belt mechanism 75, the drive pulley 751 is rotated by power received from the motor 73, and the belt 755 and the driven pulley 753 are rotated by the rotation of the drive pulley 751.

The guide rails 77, 79 each extending in the main scanning direction are spaced apart from each other in the sub-scanning direction. The guide rail 79 is formed with a hole HL. The switching lever 90 is protruded upward from the guide rail 79 through the hole HL (over a path of movement of the carriage 71). The switching lever 90 will be described below in detail with reference to FIG. 3.

The belt mechanism 75 is disposed on the guide rail 77. Each of the guide rails 77, 79 is, for example, provided with a rib, not shown, which extends in the main scanning direction to allow the carriage 71 to move only in the main scanning direction. For example, the carriage 71 has grooves in its lower surface and is supported on the guide rails 77, 79 in a state in which the carriage 71 is placed on the guide rails 77, 79, with the ribs fitted in the respective grooves. The carriage 71 in this state is moved on the guide rails 77, 79 in the main scanning direction in conjunction with the rotation of the belt 755. The recording head 80 is moved in the main scanning direction by the movement of the carriage 71.

The conveyance controller 50 (see FIG. 1) controls the conveying motor 100 according to an instruction received from the main controller 10. This conveyance controller 50 inputs a current command value U to the drive circuit 110. The drive circuit 110 controls the conveying motor 100 using pulse width modulation (PWM) and applies a drive current corresponding to the current command value U to the conveying motor 100 to drive the conveying motor 100. The conveying motor 100 is constituted by a DC motor. The conveying motor 100 is connected to a conveying roller 121 of the sheet conveying mechanism 120 to rotate the conveying roller 121.

The conveying roller 121 is rotated by power received at its one end portion in the main scanning direction from the conveying motor 100. Although not illustrated, a pinch roller may be disposed opposite to the conveying roller 121. That is, the sheet conveying mechanism 120 rotates the conveying roller 121 in a state in which the sheet Q is nipped between the conveying roller 121 and the pinch roller to convey the sheet Q in the sub-scanning direction.

The rotary encoder 130 (see FIG. 1) outputs an encoder signal in synchronization with rotation of the conveying roller 121. The detection circuit 140 detects a rotation amount X and a rotational velocity V of the conveying roller 121 based on the encoder signal received from the rotary encoder 130.

The conveyance controller 50 controls the conveying motor 100 based on the rotation amount X and the rotational velocity V detected by the detection circuit 140. By this control, the conveyance controller 50 controls rotation of the conveying roller 121 and conveyance of the sheet Q by the sheet conveying mechanism 120. For example, the rotation amount X is used for control of a position of the sheet Q, and the rotational velocity V is used for control of a velocity of conveyance of the sheet Q.

The transmission mechanism 150 is provided on the other end portion, in the main scanning direction, of the conveying roller 121 which is located on an opposite side of the conveying roller 121 from the above-described one end portion thereof. This transmission mechanism 150 receives, via the conveying roller 121, power transmitted from the conveying motor 100 and transmits the received power to a mechanical device to be driven (hereinafter may be referred to as "driving object"). Specifically, in accordance with a position of the switching lever 90, the transmission mechanism 150 transmits the power received from the conveying roller 121, selectively to one of the first sheet-supply mechanism 160, the second sheet-supply mechanism 170, the sheet reversing mechanism 180, and the maintenance mechanism 190 as mechanical devices to be driven.

The first sheet-supply mechanism 160 includes a first sheet-supply roller. This first sheet-supply roller is rotated by power transmitted from the conveying motor 100 via the conveying roller 121 and the transmission mechanism 150. The rotation of the conveying motor 100 causes the first supply roller of the first sheet-supply mechanism 160 to supply an uppermost one of the sheets Q supported on a first sheet-supply tray, toward the conveying roller 121.

Likewise, the second sheet-supply mechanism 170 includes a second sheet-supply roller which is rotated by power transmitted from the conveying motor 100 via the conveying roller 121 and the transmission mechanism 150. Like the first sheet-supply mechanism 160, the rotation of the conveying motor causes the second supply roller of the second sheet-supply mechanism 170 to supply an uppermost one of the sheets Q supported on a second sheet-supply tray, toward the conveying roller 121.

The sheet reversing mechanism 180 is a mechanical device which is driven when duplex printing is performed on the sheet Q. The sheet reversing mechanism 180 is operated by power received from the conveying motor 100 via the conveying roller 121 and the transmission mechanism 150. The sheet reversing mechanism 180 includes a reversing roller which is disposed downstream of a recording position at which the recording head 80 ejects ink droplets to record an image on the sheet Q. The sheet reversing mechanism 180 turns the conveyed sheet Q upside down and the reversing roller of the sheet reversing mechanism 180 conveys the sheet Q to an upstream side of the recording position.

The maintenance mechanism 190 is a mechanical device for performing maintenance of the recording head 80. Although not illustrated, the maintenance mechanism 190 includes: a cap to be mounted on a nozzle surface of the recording head 80; a cap elevating and lowering mechanism for elevating and lowering the cap; and a pump connected to the cap to suck ink.

In a process in which the carriage 71 enters a maintenance region G (see FIG. 2), the cap elevating and lowering mechanism gradually elevates the cap by a force applied from the carriage 71. When the carriage 71 is positioned at the maintenance region G, the cap elevating and lowering mechanism mounts the cap onto the nozzle surface of the recording head 80.

The pump is operated by power received from the conveying motor 100 via the conveying roller 121 and the transmission mechanism 150 to suck ink droplets. The maintenance mechanism 190 (the pump in particular) is driven when the carriage 71 is located at the maintenance region G.

There will be next explained the structure of the transmission mechanism 150 in detail. As illustrated in FIG. 3B, the transmission mechanism 150 includes a drive gear 210, a movable gear 220, and connection gears 230A, 230B, 230C, 230D respectively corresponding to the mechanical devices 160, 170, 180, 190. Each of the drive gear 210, the movable gear 220, and the connection gears 230A-230D is a spur gear. In the following description, when indicating a non-specific one of the connection gears 230A, 230B, 230C, 230D, the connection gear is referred to as "connection gear 230".

The drive gear 210 is fixed to the other end portion, in the main scanning direction, of the conveying roller 121 such that a rotation axis of the drive gear 210 coincides with that of the conveying roller 121. With this construction, the drive gear 210 is rotated together with the conveying roller 121. The drive gear 210 has such a dimension in its axial direction that the drive gear 210 is always meshed with the movable gear 220 in an area in which the movable gear 220 is movable.

The movable gear 220 is disposed such that the movable gear 220 is always meshed with the drive gear 210, and a rotation axis of the movable gear 220 is parallel with that of the drive gear 210. Along this rotation axis of the movable gear 220, a shaft 225 extends through a hole formed at a center of rotation of the movable gear 220. As a result, the movable gear 220 is rotatable about the shaft 225 and slidable in its axial direction.

The movable gear 220 is moved between the connection gears 230A-230D while being guided by the shaft 225. The connection gears 230A-230D are arranged such that their side surfaces perpendicular to their rotation axis are opposed to each other. The connection gears 230A-230D are aligned in a direction parallel with the rotation axis (i.e., the shaft 225) of the movable gear 220. The movable gear 220 has such a dimension in its axial direction that the movable gear 220 is meshable with each of the connection gears 230A-230D, individually.

The shaft 225 supports the switching lever 90 such that an end portion 90E of the switching lever 90 is slidable. The end portion 90E of the switching lever 90 is adjacent to the movable gear 220 and located farther from the conveying roller 121 than the movable gear 220 in the main scanning direction.

The shaft 225 is provided with two springs 227, 228 arranged such that the movable gear 220 and the switching lever 90 are interposed between the springs 227, 228. An urging force of the spring 228 is larger than that of the spring 227. Thus, the switching lever 90 receives an urging force in a direction from the connection gear 230D toward the connection gear 230A over the entire area in which the switching lever 90 is movable. Since the movable gear 220 receives the urging force from the spring 227, when the switching lever 90 is moved from a position nearer to the connection gear 230A toward the connection gear 230D, the movable gear 220 is moved following the switching lever 90.

For example, when the carriage 71 is moved forward to an end portion of the carriage conveyed path, the switching lever 90 is brought into contact with the carriage 71 and receives a pressing force from the carriage 71, whereby as illustrated in a left area in FIG. 4 the switching lever 90 is moved from a position nearer to the connection gear 230A toward the connection gear 230D. In this movement, the movable gear 220 receives the urging force from the spring 227, whereby as illustrated in a right area in FIG. 4 the movable gear 230 is moved following the switching lever 90. In the present embodiment, the movable gear 220 is thus moved, by the force received from the spring 227, to a position in accordance with a position of the switching lever 90.

As illustrated in FIG. 3A, the switching lever 90 is provided in a lever holder 240 having the above-described hole HL. The hole HL illustrated in FIG. 2 has a rectangular shape for simplicity, but specifically the hole HL has a shape illustrated in FIG. 3A. FIG. 3A illustrates the specific shape of the hole HL when the hole HL is viewed from an upper surface of the guide rail 79.

The lever holder 240 is formed with lever holding areas 241A, 241B, 241C, 241D. The switching lever 90 is held in contact with an edge of the hole HL at the lever holding area 241A, so that the switching lever 90 is not moved from the lever holding area 241A toward the conveying roller 121 due to the forces of the springs 227, 228. When the switching lever 90 is located at the lever holding area 241A, the movable gear 220 is meshed with the connection gear 230A.

When the switching lever 90 is located at the lever holding area 241B in the state in which the end portion 90E of the switching lever 90 and the movable gear 220 are held in contact with each other, the movable gear 220 is meshed with the connection gear 230B. Likewise, when the switching lever 90 is located at each of the lever holding areas 241C, 241D, the movable gear 220 is meshed with a corresponding one of the connection gears 230C, 230D.

At the end portion 90E, the switching lever 90 receives a force generated by twist of the spring 228 (i.e., a force along a circumferential direction of the shaft 225). That is, in FIG. 3A, the switching lever 90 is disposed so as to receive a force applied in a lower left direction in FIG. 3A.

With this construction, in a process in which the switching lever 90 is moved from the lever holding area 241A toward the lever holding area 241D, the switching lever 90 is moved along a lower edge of the hole HL in FIG. 3A. Accordingly, in the process in which the switching lever 90 is moved from the lever holding area 241A toward the lever holding area 241D, even when the carriage 71 is moved backward and moved away from the switching lever 90 during the process, the switching lever 90 is held at any of the lever holding areas 241B, 241C by a cutout formed in the corresponding lever holding areas 241B or 241C such that the switching lever 90 is not moved back toward the lever holding area 241A by the forces of the springs 227, 228.

After the switching lever 90 is positioned at the lever holding area 241D, when the carriage 71 is moved backward, the switching lever 90 receives the force from the spring 228 and is moved back to the lever holding area 241A while being guided by a guide 242. The guide 242 is provided with a rail 243 extending downward. The switching lever 90 is moved back to the lever holding area 241A while being held in sliding contact with the rail 243. In this movement, the movable gear 220 is moved toward the connection gear 230A with the switching lever 90 by a pressing force received from the end portion 90E of the switching lever 90.

The connection gears 230A-230D are rotatably supported by a shaft 235 extending in parallel with the rotation axis of the movable gear 220. The rotation axis of the connection gears 230A-230D coincides with the shaft 235. Each of the connection gears 230A-230D is provided within the area in which the movable gear 220 is movable.

The connection gear 230A is connected to the first sheet-supply mechanism 160. That is, the connection gear 230A receives power from the conveying roller 121 via the drive gear 210 and the movable gear 220 in the state in which the connection gear 230A is meshed with the movable gear 220, and transmits this power to the first sheet-supply mechanism 160. As a result, the first sheet-supply mechanism 160 is driven.

The connection gear 230B is connected to the second sheet-supply mechanism 170. That is, the connection gear 230B receives power from the conveying roller 121 via the drive gear 210 and the movable gear 220 in the state in which the connection gear 230B is meshed with the movable gear 220, and transmits this power to the second sheet-supply mechanism 170. As a result, the second sheet-supply mechanism 170 is driven.

The connection gear 230C is connected to the sheet reversing mechanism 180. That is, the connection gear 230C receives power from the conveying roller 121 via the drive gear 210 and the movable gear 220 in the state in which the connection gear 230C is meshed with the movable gear 220, and transmits this power to the sheet reversing mechanism 180. As a result, the sheet reversing mechanism 180 is driven.

The connection gear 230D is connected to the maintenance mechanism 190. That is, the connection gear 230D receives power from the conveying roller 121 via the drive gear 210 and the movable gear 220 in the state in which the connection gear 230D is meshed with the movable gear 220, and transmits this power to the maintenance mechanism 190. As a result, the maintenance mechanism 190 (the pump) is driven.

Figure 5:
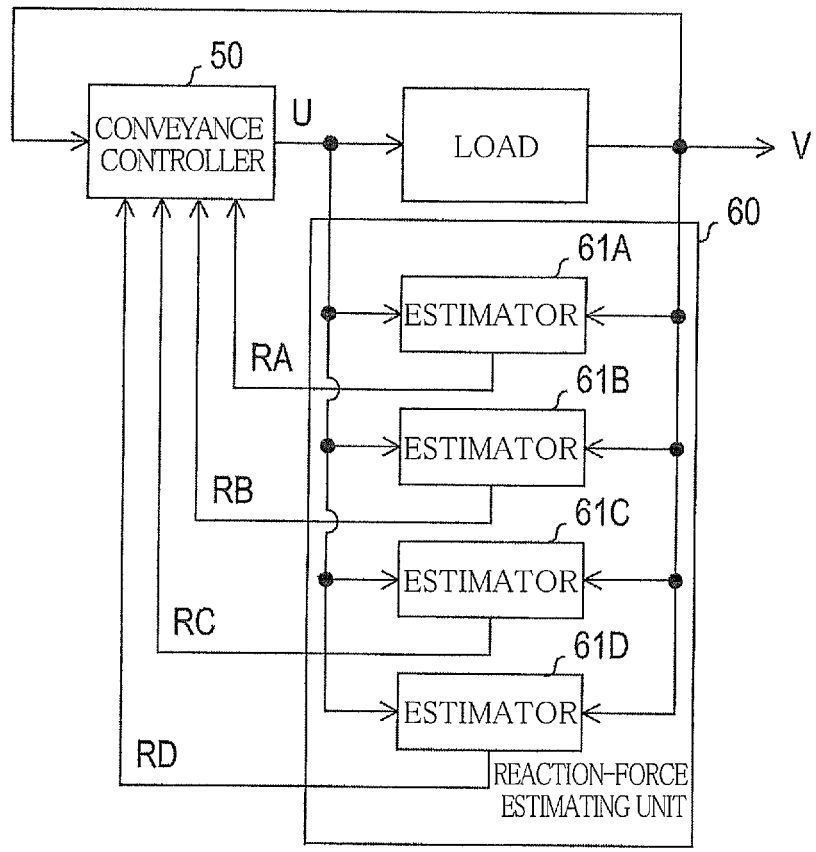
FIG. 5 is a block diagram illustrating a configuration of a reaction-force estimating unit.

There will be next explained the structure of the reaction-force estimating unit 60 in detail. As illustrated in FIG. 5, the reaction-force estimating unit 60 includes estimators 61A, 61B, 61C, 61D corresponding to the respective connection gears 230A-230D. In the following description, when indicating a non-specific one of the estimators 61A, 61B, 61C, 61D, the estimator is referred to as "estimator 61".

The estimator 61A corresponding to the connection gear 230A estimates a reaction force acting on a first power transmission system, which is a power transmission system from the conveying motor 100 to the first sheet-supply mechanism 160, on the assumption that the connection gear 230A and the movable gear 220 are meshed with each other. Specifically, the estimator 61A calculates a reaction-force estimate value R (=RA) acting on the first power transmission system, based on (i) the current command value U which is control input to the conveying motor 100 and (ii) the rotational velocity V of the conveying roller 121 which is detected by the detection circuit 140 as control output corresponding to the current command value U. A model of the first power transmission system (a mathematical model) is used for the calculation of the reaction-force estimate value RA.

The model indicates a relationship between the control output (i.e., the velocity V) and the control input (i.e., the current command value U). This model is determined by a designer and set for the estimator 61A. In the model of the estimator 61A, the reaction-force estimate value RA is zero in the state in which the connection gear 230A and the movable gear 220 are meshed with each other.

It should be understood that the reaction-force estimate value RA becomes zero precisely only in an ideal state in which a disturbance not expected in the above-described model is not caused in the image forming system 1. A disturbance occurs in normal condition. Accordingly, the estimator 61A outputs approximately zero as the reaction-force estimate value RA in the state in which the connection gear 230A and the movable gear 220 are meshed with each other. This reaction-force estimate value RA is input to the conveyance controller 50.

The estimator 61B corresponding to the connection gear 230B estimates a reaction force acting on a second power transmission system, which is a power transmission system from the conveying motor 100 to the second sheet-supply mechanism 170, on the assumption that the connection gear 230B and the movable gear 220 are meshed with each other. That is, the estimator 61B estimates a reaction-force estimate value R (=RB) based on the current command value U, the rotational velocity V, and a model of the second power transmission system. As in the model of the estimator 61A, in the model of the estimator 61B, the reaction-force estimate value RB is zero in the state in which the connection gear 230B and the movable gear 220 are meshed with each other. The reaction-force estimate value RB is input to the conveyance controller 50.

The estimator 61C corresponding to the connection gear 230C and the estimator 61D corresponding to the connection gear 230D are configured like the estimator 61A and the estimator 61B. Each of the estimators 61C, 61D estimates a reaction force acting on a power transmission system from the conveying motor 100 to a corresponding one of the sheet reversing mechanism 180 and the maintenance mechanism 190, on the assumption that a corresponding one of the connection gears 230C, 230D and the movable gear 220 are meshed with each other.

That is, the estimator 61C calculates a reaction-force estimate value R (=RC) based on the current command value U, the rotational velocity V, and the model of the corresponding power transmission system, and the estimator 61D calculates a reaction-force estimate value R (=RD) based on the current command value U, the rotational velocity V, and the model of the corresponding power transmission system. In a model of the estimator 61C, the reaction-force estimate value RC is zero in the state in which the connection gear 230C and the movable gear 220 are meshed with each other. In a model of the estimator 61D, the reaction-force estimate value RD is zero in the state in which the connection gear 230D and the movable gear 220 are meshed with each other.

Figure 6:
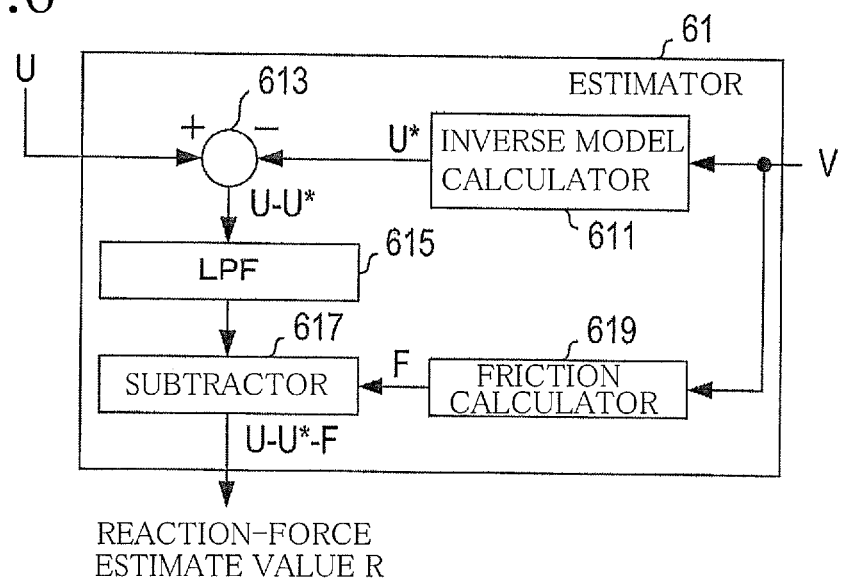
FIG. 6 is a block diagram illustrating a configuration of an estimator in detail.

There will be next explained configurations of the estimators 61A-61D in detail. As illustrated in FIG. 6, the estimator 61 includes an inverse model calculator 611, a subtractor 613, a low-pass filter 615, a subtractor 617, and a friction calculator 619. In the case where the power transmission system for calculating the reaction-force estimate value R is configured such that a relationship between the current command value U (i.e., the control input) and the rotational velocity V (i.e., the control output) can be converted into an expression "V=H·U" using a transfer function H, the inverse model calculator 611 has a configuration described below.

That is, the inverse model calculator 611 uses an inverse model H−1 of the transfer function H to convert the rotational velocity V of the conveying roller 121, which is input from the detection circuit 140, into a current command value U* (=H−1·V) corresponding to the velocity V. It is assumed, however, that the transfer function H does not contain elements of viscous friction and Coulomb friction (i.e., dynamical friction) on the rotation shaft of the power transmission system corresponding to the estimator 61. For example, the transfer function H is determined by expressing the power transmission system in a rigid body model. The transfer function H in this case can be expressed as "H=K/s" using a constant K and a Laplace operator s, and the inverse model can be expressed as "H−1=(1/K)·s".

The subtractor 613 calculates a disturbance estimate value τ (=U−U*) by subtracting a current command value U* output from the inverse model calculator 611, from the current command value U input from the conveyance controller 50 to the drive circuit 110. A torque and a current applied to the conveying motor 100 are proportional to each other. Thus, the disturbance estimate value τ corresponds to a component of a force not expressed in the transfer function H acting on the power transmission system.

The low-pass filter 615 corrects the disturbance estimate value τ so as to remove high frequency components and outputs the corrected disturbance estimate value τ. This corrected disturbance estimate value τ is input to the subtractor 617. The friction calculator 619 calculates an estimate value F of a frictional force acting in the power transmission system, according to a predetermined function F(V), and inputs the calculated frictional-force estimate value F to the subtractor 617. Specifically, the friction calculator 619 inputs the rotational velocity V of the conveying roller 121, which is input from the detection circuit 140, to the function F(V) (=D·V+C) to calculate the frictional-force estimate value F (=F(V)). Here, the coefficient D corresponds to a coefficient of viscous friction, and a constant C corresponds to a Coulomb frictional force (i.e., a dynamical frictional force). The coefficient D and the constant C are obtained by testing and set for the friction calculator 619.

The subtractor 617 calculates the reaction-force estimate value R (=τ−F) by subtracting the frictional-force estimate value F input from the friction calculator 619, from the disturbance estimate value t input from the low-pass filter 615 and inputs the calculated reaction-force estimate value R to the conveyance controller 50.

The above-described model of the power transmission system corresponds to (i) a function for calculating the current command value U* based on the velocity V and (ii) a function for calculating the frictional-force estimate value F based on the velocity V. In the models for the respective estimators 61A-61D, the coefficient D and the constant C are adjusted so as to make the reaction-force estimate value R zero in the state in which the corresponding connection gear 230 and the movable gear 220 are meshed with each other.

Figure 7A:
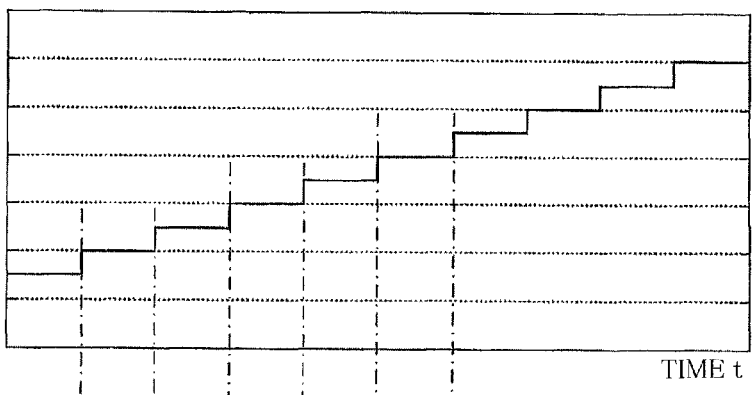
FIGS. 7A through 7D are views for explaining a method of identifying a friction model.

The coefficient D and the constant C may be determined by causing the conveyance controller 50 to control the conveying motor 100 to adjust the rotational velocity V of the conveying roller 121 to a target velocity Vr while changing the target velocity Vr stepwise as illustrated in FIG. 7A in the state in which the corresponding connection gear 230 and the movable gear 220 are meshed with each other.

Figure 7B:
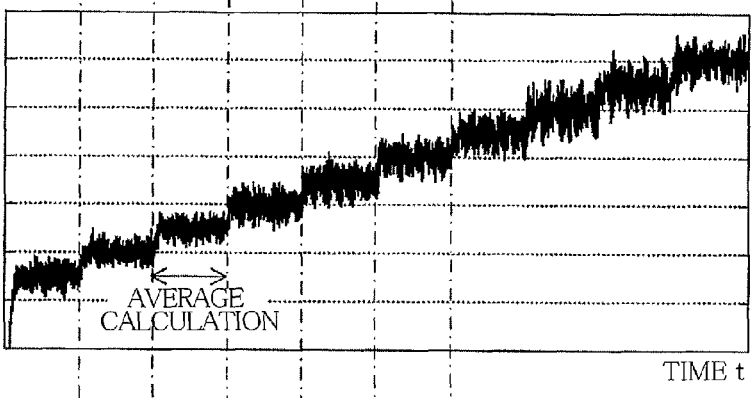
Figure 7C:
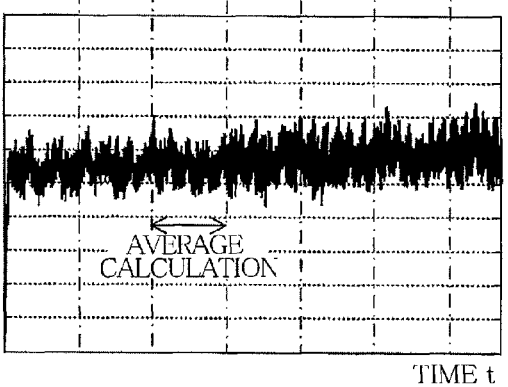

In a process of this control, as illustrated in FIG. 7B, the conveyance controller 50 calculates an average value of the rotational velocities V detected by the detection circuit 140 each time when the target velocity Vr is changed. Also, as illustrated in FIG. 7C, the conveyance controller 50 calculates an average value of the current command values U input from the conveyance controller 50 to the drive circuit 110, each time when the target velocity Vr is changed. When the transfer function H is expressed in the rigid body model, the current command value U corresponds to a friction component such that the inverse model H−1 contains a derivative element, in a state in which the velocity V is stably constant.

Figure 7D:
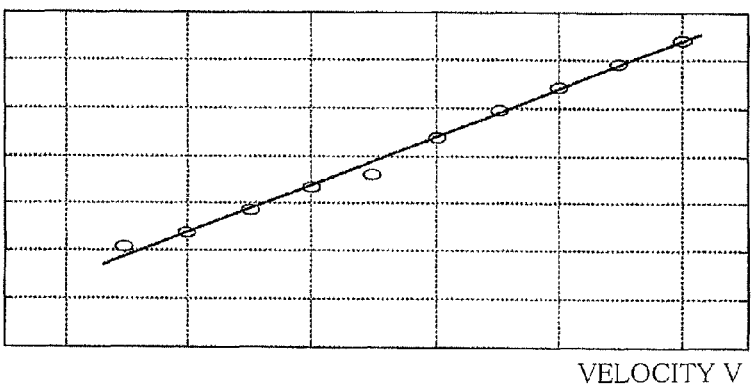

Accordingly, when a pair of the current command value U (i.e., the average value) and the velocity V (i.e., the average value) obtained at each change of the target velocity Vr are as illustrated in FIG. 7D approximated by a linear function "U=D·V+C" using a least squares method, the frictional force acting on the power transmission system can be calculated with high accuracy by the approximated linear function. By setting the coefficient D and the constant C obtained by the linear function, for the friction calculator 619, the estimator 61 is configured to calculate and determine zero as the reaction-force estimate value R in the state in which the corresponding connection gear 230 and the movable gear 220 are meshed with each other.

In the case where the estimators 61A-61D are configured as described above, the conveyance controller 50 can refer to the reaction-force estimate values R output from the respective estimators 61A-61D, to sense mesh and separation of the movable gear 220 with and from the respective connection gears 230A-230D. As illustrated in the left area in FIG. 4, consider the case where the movable gear 220 is moved to the connection gear 230B by movement of the switching lever 90 pressed by the carriage 71 in the state in which the movable gear 220 is meshed with the connection gear 230A.

Even when the switching lever 90 is moved toward the connection gear 230B, the movable gear 220 is not moved toward the connection gear 230B immediately after the movement of the switching lever 90. Examples of the state in which the movable gear 220 is meshed with the drive gear 210 and the connection gear 230A include: a state in which a tooth of the movable gear 220 and that of the drive gear 210 are held in firm contact with each other (at a high pressure) and a state in which a tooth of the movable gear 220 and a tooth of the connection gear 230A are held in firm contact with each other. In these cases, since frictional force acting on contact surfaces is larger than the urging force of the spring 227, the movable gear 220 cannot be moved toward the connection gear 230B. As another case, in the case where a tooth of the movable gear 220 and a tooth of the connection gear 230B which are adjacent to a direction of movement overlap each other in the axial direction, interference between the teeth of the movable gear 220 and the connection gear 230B inhibits the movable gear 220 from moving to a position at which the movable gear 220 is to be meshed with the connection gear 230B.

A well-known gear engaging operation can be performed to eliminate such a contact state and interference between the teeth. In the present embodiment, the gear engaging operation is an operation in which the conveying motor 100 is controlled to rotate the movable gear 220 alternately in forward and reverse rotational directions each by a small amount. This rotation can eliminate such a contact state and interference between the teeth. With this elimination, as illustrated in the right area in FIG. 4, the movable gear 220 is moved from the connection gear 230A to the connection gear 230B.

In a conventional technique, the gear engaging operation is performed redundantly because such movement of the movable gear 220 cannot be recognized. In the present embodiment, however, when the movable gear 220 is meshed with the connection gear 230A and has not moved to the connection gear 230B, the reaction-force estimate value RA output from the estimator 61A is a value near zero. In contrast, the estimator 61B determines a value considerably far from zero as the reaction-force estimate value RB because the reaction-force estimate value RB is calculated according to the model predicated on the mesh between the connection gear 230B and the movable gear 220 although the connection gear 230B and the movable gear 220 are not meshed with each other.

Accordingly, the conveyance controller 50 can determine whether the movable gear 220 is meshed with the connection gear 230A by determining whether an absolute value |RA| of the reaction-force estimate value RA is not greater than a threshold value TH. Likewise, the conveyance controller 50 can determine whether the movable gear 220 is spaced apart from the connection gear 230B by determining whether an absolute value |RB| of the reaction-force estimate value RB is greater than the threshold value TH.

Consider the case where the movable gear 220 is moved from the connection gear 230A and meshed with the connection gear 230B by the gear engaging operation. In this case, the estimator 61A determines a value considerably far from zero as the reaction-force estimate value RA because the reaction-force estimate value RA is calculated according to the model predicated on the mesh between the connection gear 230A and the movable gear 220 although the connection gear 230A and the movable gear 220 are not meshed with each other. The estimator 61B determines a value near zero as the reaction-force estimate value RB in this case.

Accordingly, the conveyance controller 50 can determine whether the movable gear 220 is spaced apart from the connection gear 230A and meshed with the connection gear 230B by determining whether the absolute value |RA| of the reaction-force estimate value RA is greater than the threshold value TH and determining whether the absolute value |RB| of the reaction-force estimate value RB is not greater than the predetermined threshold value. In the present embodiment, the mesh and the separation of the movable gear 220 with and from the connection gears 230A-230D can be detected by this determination. Thus, the gear engaging operation can be finished when the movable gear 220 is meshed with a target one of the connection gears 230, without performing the gear engaging operation redundantly, resulting in increase in efficiency of the gear engaging operation.

Figure 8:
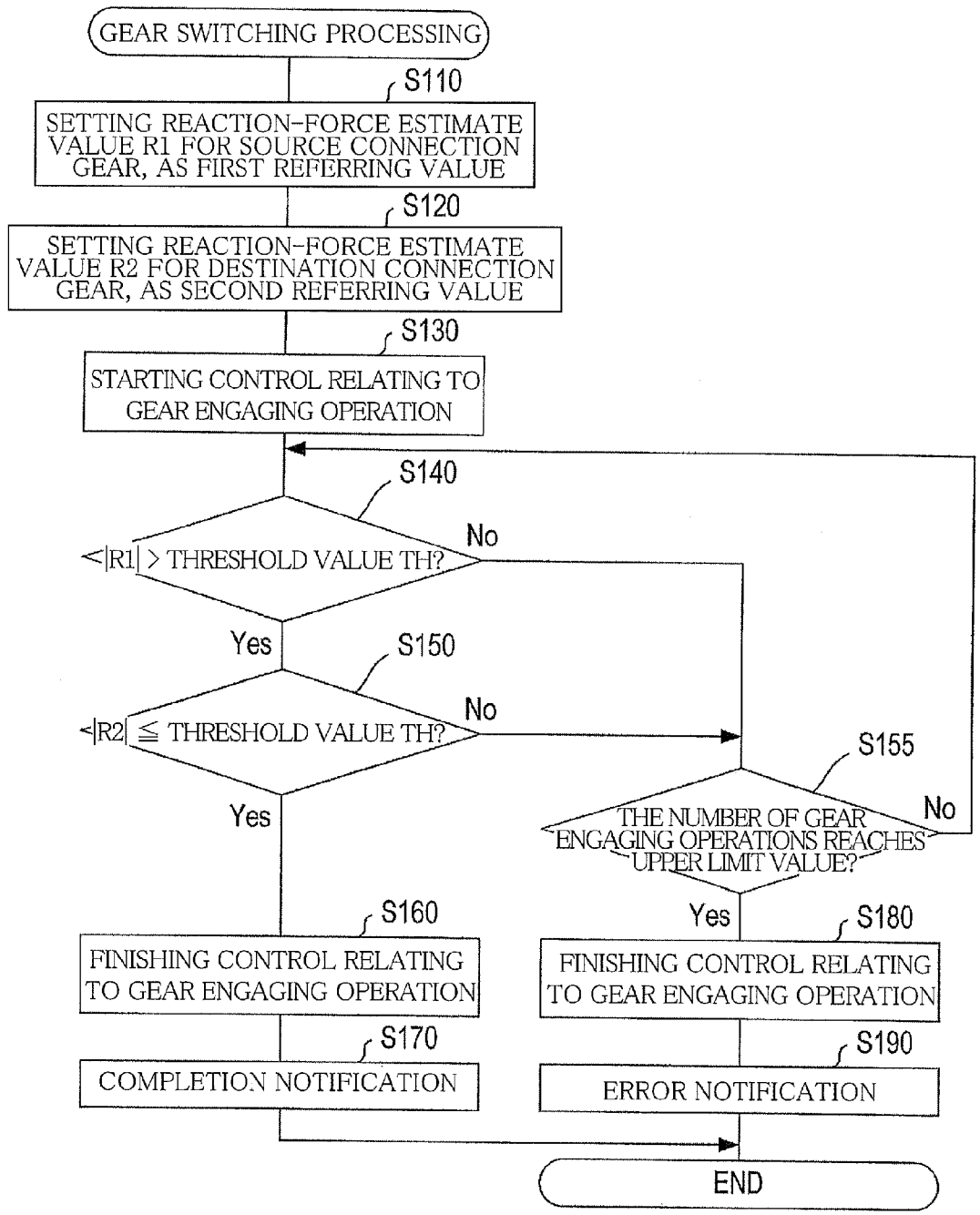
FIG. 8 is a flow chart illustrating a gear switching processing executed by a conveyance controller.

There will be next explained, with reference to FIG. 8, a gear switching processing in detail which is executed by the conveyance controller 50 to move the movable gear 220 to a position designated by the main controller 10. The conveyance controller 50 executes the gear switching processing according to an instruction received from the main controller 10. At the start of the gear switching processing, the main controller 10 instructs the print controller 40 to control movement of the carriage 71 to move the switching lever 90 to a position corresponding to a destination of movement of the movable gear 220. That is, the main controller 10 instructs the print controller 40 to control movement of the carriage 71 to move the switching lever 90 to one of the lever holding areas 241A, 241B, 241C, 241D at which the switching lever 90 is to be positioned so as to correspond to the destination of movement of the movable gear 220.

The gear switching processing begins with S110 at which the conveyance controller 50 at S110 sets the reaction-force estimate value R obtained from the estimator 61 corresponding to a source connection gear 230, as a first referring value which is a first value to be referred to. The conveyance controller 50 at S120 sets the reaction-force estimate value R obtained from the estimator 61 corresponding to a destination connection gear 230, as a second referring value which is a second value to be referred to. The source connection gear 230 is one of the connection gears 230 which is meshed with the movable gear 220 at the start of the gear switching processing. The destination connection gear 230 is one of the connection gears 230 which is designated by the main controller 10 and to which the movable gear 220 is to be moved in the gear switching processing.

At S130, the conveyance controller 50 starts control (mesh control) relating to the gear engaging operation for moving the movable gear 220 in conjunction with movement of the switching lever 90. That is, the conveyance controller 50 starts controlling the conveying motor 100 to repeatedly rotate the movable gear 220 in the forward and reverse rotational directions alternately each by the small amount. While keeping to execute this processing, the conveyance controller 50 then repeatedly executes processings at S140, S150, and S155. First, based on the latest reaction-force estimate value R (=R1) as the first referring value, the conveyance controller 50 at S140 determines whether an absolute value |R1| of this reaction-force estimate value R1 is greater than the predetermined threshold value TH.

The threshold value TH is a value between (i) the reaction-force estimate value R in a state in which the source connection gear 230 and the movable gear 220 are meshed with each other and (ii) the reaction-force estimate value R in a state in which the movable gear 220 is spaced apart from the source connection gear 230. More specifically, the threshold value TH is determined at a value slightly greater than a range of changes in the reaction-force estimate value R output from the estimator 61 corresponding to the source connection gear 230 in the state in which the source connection gear 230 and the movable gear 220 are meshed with each other. This is because the reaction-force estimate value R changes with time around zero due to disturbances even in the state in which the source connection gear 230 and the movable gear 220 are meshed with each other.

When the absolute value |R1| is greater than the threshold value TH (S140: Yes), this flow goes to S150. When the absolute value |R1| is less than or equal to the threshold value TH (S140: No), this flow goes to S155. The state in which the absolute value |R1| is greater than the threshold value TH indicates that the movable gear 220 is spaced apart from the source connection gear 230. The state in which the absolute value |R1| is less than or equal to the threshold value TH indicates the movable gear 220 is meshed with the source connection gear 230, in other words, the movable gear 220 is not spaced apart from the source connection gear 230.

At S155, the conveyance controller 50 determines whether the number of executions of the gear engaging operation for rotating the movable gear 220 forwardly and reversely reaches an upper limit value. In the present embodiment, one gear engaging operation corresponds to a set of an operation for rotating the movable gear 220 in the forward rotational direction by a predetermined amount and an operation for rotating the movable gear 220 in the reverse rotational direction by the predetermined amount. The upper limit value is determined at the number of executions of the gear engaging operation which is enough for the movable gear 220 to be moved from the source connection gear 230 to the destination connection gear 230 and meshed with the destination connection gear 230 without malfunction.

When the number of the gear engaging operations does not reach the upper limit value (S155: No), this flow goes to S140. When the number of the gear engaging operations reaches the upper limit value (S155: Yes), the conveyance controller 50 at S180 finishes the control relating to the gear engaging operation which is started at S130. Then, the conveyance controller 50 at S190 inputs an error notification to the main controller 10, and this flow ends. Upon receiving this error notification, the main controller 10 controls the user interface 30 to notify the user of the error.

At S150, based on the latest reaction-force estimate value R (=R2) as the second referring value, the conveyance controller 50 determines whether an absolute value |R2| of the reaction-force estimate value R2 is not greater than the threshold value TH. When the absolute value |R2| is greater than the threshold value TH (S150: No), this flow goes to S155. When the absolute value |R2| is less than or equal to the threshold value TH (S150: Yes), this flow goes to S160. The state in which the absolute value |R2| is greater than the threshold value TH indicates that the movable gear 220 is not meshed with the destination connection gear 230. The state in which the absolute value |R2| is less than or equal to the threshold value TH indicates that the movable gear 220 is meshed with the destination connection gear 230.

At S160, the conveyance controller 50 finishes the control relating to the gear engaging operation which is started at S130. At S170, the conveyance controller 50 inputs, to the main controller 10, a completion notification which indicates a completion of movement of the movable gear 220 to the target connection gear 230, and this flow ends.

Figure 9A:
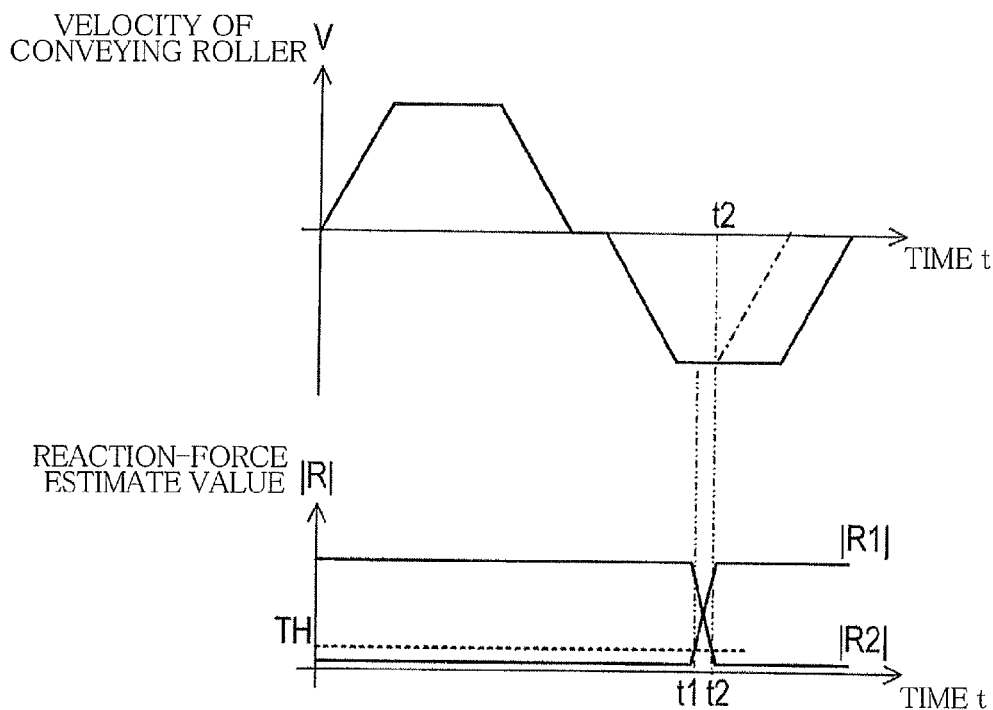
FIGS. 9A and 9B are graphs illustrating changes of an absolute value |R| of a reaction-force estimate value R with changes in velocity V of a conveying roller.

In the example illustrated in FIG. 9A, the movable gear 220 is spaced apart from the source connection gear 230 at time t1 by the gear engaging operation, so that the absolute value |R1| of the reaction-force estimate value R1 of the source connection gear 230 becomes greater than the threshold value TH. At time t2, the movable gear 220 is meshed with the destination connection gear 230, the absolute value |R2| of the reaction-force estimate value R2 of the destination connection gear 230 becomes less than or equal to the threshold value TH. The upper area in FIG. 9A illustrates a graph indicating changes in the rotational velocity V of the conveying roller 121 with time. The lower area in FIG. 9A illustrates a graph indicating changes in the absolute values of the reaction-force estimate values R1, R2 with time.

At this time t2, the conveyance controller 50 executes the processing at S160 in which when one gear engaging operation performed at time t2 is finished, the conveyance controller 50 cancels the gear engaging operations to be executed thereafter and finishes the gear switching processing. However, when the flow goes to S160 at time t2, as indicated by the one-dot chain line in FIG. 9A, the conveyance controller 50 may immediately interrupt the gear engaging operation to stop driving of the conveying motor 100.

In the image forming system 1 according to the present embodiment, each of the estimators 61A-61D provided corresponding to the respective connection gears 230A-230D estimates the reaction force to be applied to the power transmission system extending from the conveying motor 100 to a corresponding one of the mechanical devices 160, 170, 180, 190 to be driven, based on (i) the control input (i.e., the current command value U) from the conveyance controller 50 to the conveying motor 100 (ii) the control output (i.e., the rotational velocity V of the conveying roller 121) corresponding to the control input, and (iii) the predetermined model of the power transmission system (i.e., the function for calculating the current command value U* based on the velocity V and the function for calculating the frictional-force estimate value F based on the velocity V).

In each of the models set for the respective estimators 61A-61D, the reaction-force estimate value R is ideally zero in the state in which the movable gear 220 is meshed with the connection gear 230 corresponding to the estimator 61. The conveyance controller 50 executes the processings at S140, S150, and S155 to detect mesh or separation between each of the connection gears 230A-230D and the movable gear 220 based on the reaction-force estimate value R obtained by a corresponding one of the estimators 61.

In the present embodiment, the mesh and separation can be detected using the rotational velocity V of the conveying roller 121 which is referred to during feedback control for the conveying motor 100, without providing an additional sensor or other devices. The rotational velocity V of the conveying roller 121 is also used for control for conveyance of the sheet Q. In the control for the conveying motor 100 in the form of the DC motor, the rotary encoder 130 is normally required for the feedback control.

In the present embodiment, the rotary encoder 130 need not be provided in the image forming system 1 only for detection of the mesh and separation between the gears. In the present embodiment, accordingly, the function for detecting the mesh and separation can be provided on the image forming system 1 with increased productivity and at low cost, resulting in the useful image forming system 1.

Also, in the present embodiment, the conveyance controller 50 uses the threshold value TH to detect the mesh when the reaction-force estimate value R is less than or equal to the threshold value TH and detects the separation when the reaction-force estimate value R is greater than the threshold value TH. Accordingly, the conveyance controller 50 can easily and accurately detect the mesh and separation between the gears. In the present embodiment, the conveyance controller 50 finishes the control relating to the gear engaging operation when mesh between the target connection gear 230 and the movable gear 220 is detected based on the reaction-force estimate value R obtained by the estimator 61 corresponding to the target connection gear 230, after the control relating to the gear engaging operation is started at S130 as control for meshing the movable gear 220 with the target connection gear 230.

In conventional devices, even when a movable gear is meshed with a target connection gear, a controller cannot detect the mesh, and accordingly a processing for switching the gear is continued unnecessarily and redundantly. In the present embodiment, however, the conveyance controller 50 can detect the mesh and separation between each of the connection gears 230A-230D and the movable gear 220. Thus, the conveyance controller 50 need not unnecessarily keep the gear switching processing, thereby efficiently executing the processing to be executed after the switching of the gears. Accordingly, in the image forming system 1 according to the present embodiment, the conveyance controller 50 can efficiently switch and drive one of the plurality of mechanical devices 160, 170, 180, 190 using the single drive source.

In the present embodiment, also when the number of executions of the gear engaging operation reaches the upper limit value in the state in which the mesh between the target connection gear 230 and the movable gear 220 is not detected, the conveyance controller 50 finishes the control relating to the gear engaging operation. Accordingly, in the case where the mesh between the target connection gear 230 and the movable gear 220 is not finished for some reason, the conveyance controller 50 need not unnecessarily continue the control relating to the gear engaging operation.

There will be next explained the image forming system 1 according to a modification of the above-described embodiment. In this modification, the conveyance controller 50 executes a gear switching processing illustrated in FIG. 10 instead of the gear switching processing illustrated in FIG. 8. The other configuration of the image forming system 1 according to the modification is similar to that of the image forming system 1 according to the above-described embodiment.

Figure 10:
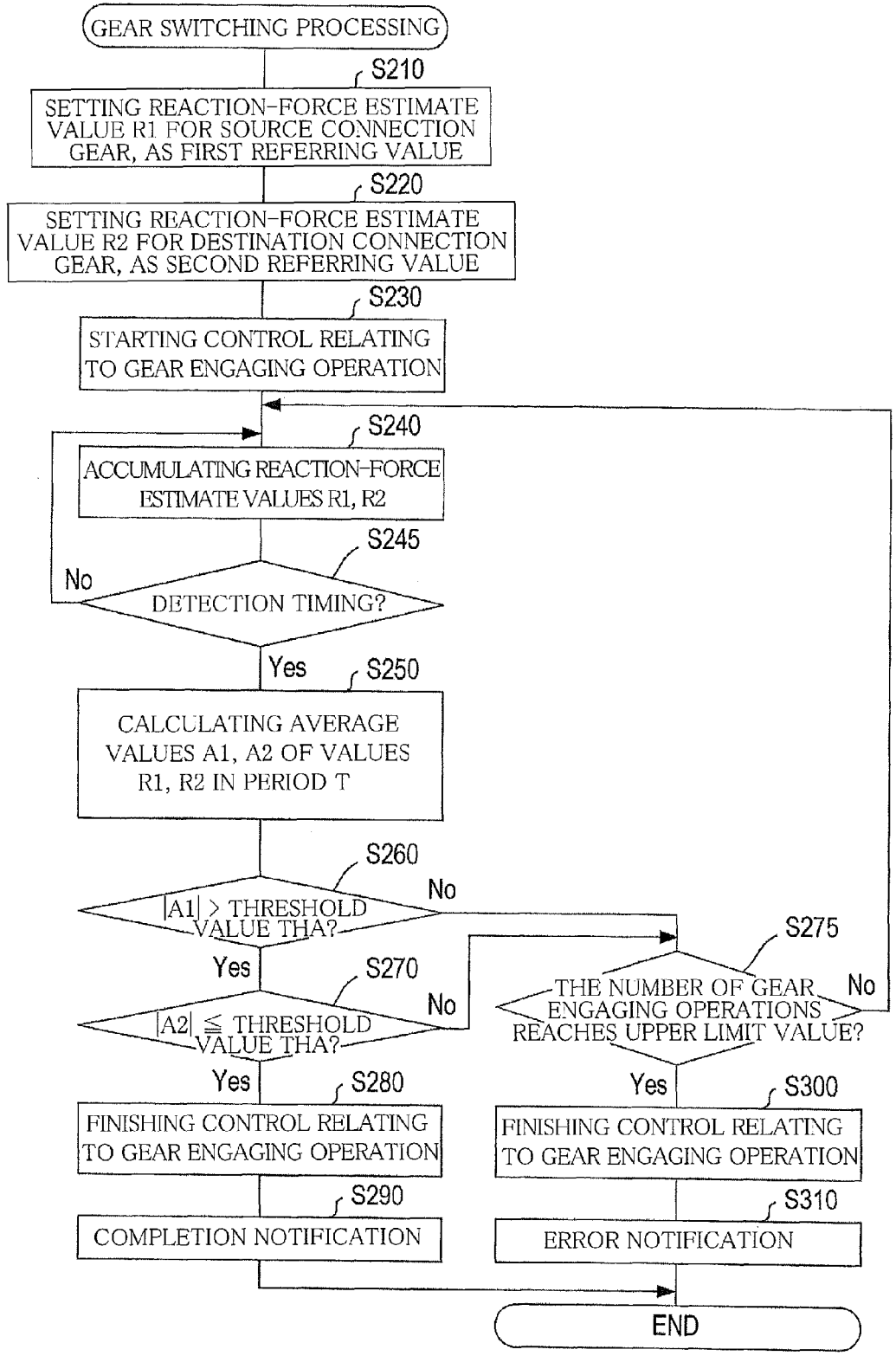
FIG. 10 is a flow chart illustrating a gear switching processing in a modification.

In this modification, when the gear switching processing illustrated in FIG. 10 is started, as in the processings at S110 and S120, the conveyance controller 50 at S210 sets the reaction-force estimate value R obtained from the estimator 61 corresponding to the source connection gear 230, as the first referring value, and at S220 sets the reaction-force estimate value R obtained from the estimator 61 corresponding to the destination connection gear 230, as the second referring value. The conveyance controller 50 at S230 starts the control relating to the gear engaging operation as in the processing at S130, and this flow goes to S240.

The conveyance controller 50 at S240 temporarily stores the reaction-force estimate value R (=R1) as the first referring value and the reaction-force estimate value R (=R2) as the second referring value, at the current time. The conveyance controller 50 at S245 determines whether a detection timing has arrived which is to arrive each time when a predetermined length of time T is elapsed. When the detection timing has not arrived (S245: No), this flow goes to S240. That is, until the detection timing has arrived, the conveyance controller 50 at each time stores the reaction-force estimate value R1 as the first referring value and the reaction-force estimate value R2 as the second referring value. When the detection timing has arrived (S245: Yes), this flow goes to S250.

The conveyance controller 50 at S250 calculates (i) a first average value A1 which is an average value of the reaction-force estimate values R1 estimated and accumulated in the period from the preceding detection timing to the current detection timing and (ii) a second average value A2 which is an average value of the reaction-force estimate values R2 estimated and accumulated in the period from the preceding detection timing to the current detection timing. Here, the conveyance controller 50 calculates, as the average values A1, A2, the average values of the reaction-force estimate values R1, R2 per time T which is a cycle of arrival of the detection timing.

The conveyance controller 50 at S260 determines whether an absolute value |A1| of the first average value A1 is greater than a predetermined threshold value THA. The threshold value THA is determined at a value slightly greater than a range of variation of an average value of the reaction-force estimate value R which can be output per the predetermined time T from the estimator 61 corresponding to the source connection gear 230 in the state in which the source connection gear 230 and the movable gear 220 are meshed with each other.

Here, when the absolute value |A1| is greater than the threshold value THA (S260: Yes), this flow goes to S270. When the absolute value |A1| is less than or equal to the threshold value THA (S260: No), this flow goes to S275. The state in which the absolute value |A1| is greater than the threshold value THA indicates that the movable gear 220 is spaced apart from the source connection gear 230. The state in which the absolute value |A1| is less than or equal to the threshold value THA indicates that the movable gear 220 is meshed with the source connection gear 230, in other words, the movable gear 220 is not spaced apart from the source connection gear 230.

As in the processing at S155, the conveyance controller 50 at S275 determines whether the number of executions of the gear engaging operation reaches the upper limit value. When the number of executions of the gear engaging operation does not reach the upper limit value (S275: No), this flow goes to S240. When the number of executions of the gear engaging operation reaches the upper limit value (S275: Yes), the conveyance controller 50 at S300 finishes the control relating to the gear engaging operation which is started at S230. The conveyance controller 50 at S310 inputs the error notification to the main controller 10.

At S270, the conveyance controller 50 determines an absolute value |A2| of the second average value A2 is less than or equal to the threshold value THA. When the absolute value |A2| is greater than the threshold value THA (S270: No), this flow goes to S275. When the absolute value |A2| is less than or equal to the threshold value THA (S270: Yes), this flow goes to S280. The state in which the absolute value |A2| is greater than the threshold value THA indicates that the movable gear 220 is not meshed with the destination connection gear 230. The state in which the absolute value |A2| is less than or equal to the threshold value THA indicates that the movable gear 220 is meshed with the destination connection gear 230.

Figure 9B:
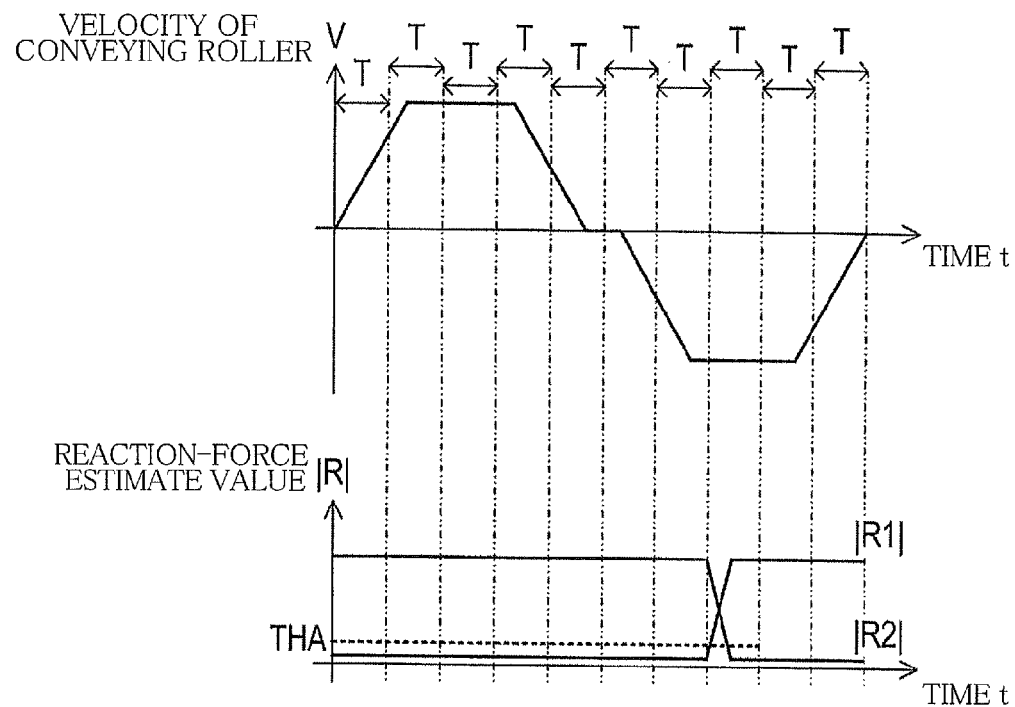

The conveyance controller 50 at S280 finishes the control relating to the gear engaging operation which is started at S230. At S290, the conveyance controller 50 inputs, to the main controller 10, a completion notification which indicates a completion of movement of the movable gear 220 to the target connection gear 230, and this flow ends. Like FIG. 9A, the upper area in FIG. 9B illustrates a graph indicating the rotational velocity V of the conveying roller 121 during the gear engaging operation, with the horizontal axis indicating a time, and the lower area in FIG. 9B illustrates a graph indicating the absolute value |R1| of the reaction-force estimate value R1 of the source connection gear 230 and the absolute value |R2| of the reaction-force estimate value R2 of the destination connection gear 230, with the horizontal axis indicating a time. The two-dot chain lines in FIG. 9B indicate examples of sections in each of which the reaction-force estimate values R1, R2 are individually averaged.

In the image forming system 1 according to the modification, the conveyance controller 50 executes a statistical processing for the reaction-force estimate value R1 as the first referring value to calculate the average value A1 each time when the time T is elapsed. When the absolute value |A1| is greater than the threshold value THA, the conveyance controller 50 detects separation between the movable gear 220 and the source connection gear 230. Also, the conveyance controller 50 executes a statistical processing for the reaction-force estimate value R2 as the second referring value to calculate the average value A2 each time when the time T is elapsed. When the absolute value |A2| is less than or equal to the threshold value THA, the conveyance controller 50 detects mesh between the movable gear 220 and the destination connection gear 230. In the present modification, accordingly, the conveyance controller 50 can accurately detect the mesh and separation between the gears with reduced noise components in high frequencies which are contained in the reaction-force estimate values R1, R2.

While the embodiment and its modification have been described above, it is to be understood that the disclosure is not limited to the details of the illustrated embodiment and the modification, but may be embodied with various changes and other modifications, which may occur to those skilled in the art, without departing from the spirit and scope of the disclosure. There will be explained alternative embodiments. In the above-described modification, the conveyance controller 50 at S250 calculates the average value of the reaction-force estimate values R but may calculate a median value or a mode value instead of the average value, for example. That is, the conveyance controller 50 may detect mesh and separation between the gears using the average value, the median value, or the mode value as a representative value of the reaction-force estimate values R obtained by execution of a statistical processing for the reaction-force estimate values R in a predetermined unit time.

Application of the present disclosure is not limited to the ink-jet printer, but the present disclosure may be applied to various devices. For example, the present disclosure may be applied to scanners and image forming systems having a sheet conveying function other than the ink-jet printer.

In the above-described embodiment, the first sheet-supply mechanism 160, the second sheet-supply mechanism 170, the sheet reversing mechanism 180, and the maintenance mechanism 190 are taken as examples of the mechanical devices to be driven, but the mechanical devices to be driven are not limited to these mechanisms. Furthermore, each of the mechanical devices to be driven by the single drive source need not be independent of each other and may include a mechanical element or elements shared with another mechanical device. That is, each of the mechanical devices is distinguished from the other mechanical devices in that these mechanical devices are respectively connected to the connection gears 230 different from each other. Each of the mechanical devices is not limited to being independent of another mechanical device.

In the above-described embodiment, the four estimators 61A, 61B, 61C, 61D are provided for the respective four driving objects (the respective four mechanical devices) 160, 170, 180, 190. However, this image forming system 1 may be configured such that the estimator 61A is provided only in the first sheet-supply mechanism 160 among the four driving objects and no estimator is provided in the other driving objects 170, 180, 190, for example. In this configuration, the image forming system 1 may be configured such that, after the control relating to the gear engaging operation is started at S130 in the gear switching processing in FIG. 8, the conveyance controller 50 continues the control relating to the gear engaging operation when the absolute value of the reaction-force estimate value R1 is greater than the threshold value TH, and the conveyance controller 50 finishes the control relating to the gear engaging operation at S160 when the absolute value of the reaction-force estimate value R1 becomes less than the threshold value TH. Also, the image forming system 1 may be configured such that the estimators 61A, 61B, 61C are provided in the respective three driving objects 160, 170, 180 among the four driving objects, and no estimator is provided in the driving object 190. In this configuration, the gear switching processing in FIG. 8 may be executed for the three driving objects 160, 170, 190.

In view of the above-described embodiments and modifications, the conveying motor 100 is one example of a drive source, and the conveyance controller 50 is one example of a controller. The switching lever 90 and the springs 227, 228 are one example of a power applying mechanism.

What is claimed is:

1. A drive device, comprising:
   a plurality of connection gears each connected to a corresponding one of a plurality of driving objects to drive the corresponding one of the plurality of driving objects;
   a movable gear movable between the plurality of connection gears and meshable with each of the plurality of connection gears;
   a single drive source configured to rotate the movable gear to rotate one of the plurality of connection gears which is in meshing engagement with the movable gear;
   a controller configured to control the drive source; and
   at least one estimator each provided for a corresponding one of at least one connection gear of the plurality of connection gears and configured to:
   estimate a reaction-force estimate value, as an estimate value of a reaction force acting in a power transmission system from the drive source to a corresponding one of the plurality of driving objects, based on a frictional-force estimate value acting in the power transmission system and based on (i) control input supplied from the controller to the drive source, (ii) control output corresponding to the control input, and (iii) a model of the power transmission system, the model indicating a relationship between the control output and the control input; and
   output the estimated reaction-force estimate value to the controller, wherein the model set for each of the at least one estimator is configured such that the reaction-force estimate value falls within a set range in a state in which the movable gear is in meshing engagement with a corresponding one of the plurality of connection gears, and wherein the controller is configured to detect at least one of mesh and separation between the movable gear and each of the at least one connection gear based on the reaction-force estimate value obtained by a corresponding one of the at least one estimator.

2. The drive device according to claim 1, wherein the at least one estimator comprises a plurality of estimators provided respectively for the plurality of connection gears.

3. The drive device according to claim 1, wherein the controller is configured to, when the reaction-force estimate value is a value within the set range, detect mesh between the movable gear and one of the plurality of connection gears which corresponds to one estimator of the at least one estimator which outputs the reaction-force estimate value, or the controller is configured to, when the reaction-force estimate value is a value outside the set range, detect separation between the movable gear and the connection gear corresponding to the one estimator configured to output the reaction-force estimate value.

4. The drive device according to claim 1, wherein the controller is configured to, when a representative value of the reaction-force estimate value obtained by executing a statistical processing for the reaction-force estimate value per particular unit time is a value within the set range, detect mesh between the movable gear and one of the plurality of connection gears which corresponds to one estimator of the at least one estimator which outputs the reaction-force estimate value, or the controller is configured to, when the representative value is a value outside the set range, detect separation between the movable gear and the connection gear corresponding to the one estimator configured to output the reaction-force estimate value.

5. The drive device according to claim 1,
wherein the controller is configured to execute mesh control for meshing the movable gear with one connection gear of the plurality of connection gears, and
wherein the controller is configured to finish the mesh control when the controller detects a state of mesh between the one connection gear and the movable gear in the mesh control based on the reaction-force estimate value obtained by one of the at least one estimator which corresponds to the one connection gear.

6. The drive device according to claim 5, further comprising a power applying mechanism configured to apply power to the movable gear such that the movable gear is moved between the plurality of connection gears, wherein the controller is configured to rotate the movable gear in a forward rotational direction and in a reverse rotational direction alternately in the mesh control in a state in which power for moving the movable gear toward the one connection gear is applied to the movable gear by the power applying mechanism.

7. The drive device according to claim 5, wherein the controller is configured to finish the mesh control when an amount of execution of the mesh control reaches a set amount in a state in which the controller does not detect the state of the mesh between the one connection gear and the movable gear.

8. The drive device according to claim 5, wherein the controller is configured to make a notification about occurrence of error when an amount of execution of the mesh control reaches a set amount in a state in which the controller does not detect the state of the mesh between the one connection gear and the movable gear.

9. The drive device according to claim 1, wherein the frictional-force estimate value is estimated based on the control output.

10. The drive device according to claim 9,
wherein the at least one estimator is configured to estimate a disturbance estimate value based on the control input, the control output, and an inverse model of a transfer function of the power transmission system, and
wherein the at least one estimator is configured to estimate the reaction-force estimate value by subtracting the frictional-force estimate value from the disturbance estimate value.

11. An ink-jet printer comprising the drive device according to claim 1, the ink-jet printer comprising a plurality of mechanisms as the plurality of driving objects,
wherein the drive device is configured to drive each of the plurality of mechanisms to perform a corresponding one of operations different from each other,
wherein the plurality of connection gears are respectively connected to the plurality of mechanisms,
wherein the drive device is configured to drive each of the plurality of mechanisms by transmitting power, which is generated by the single drive source shared by the plurality of mechanisms, to one mechanism of the plurality of mechanisms via (i) one connection gear of the plurality of connection gears which corresponds to the one mechanism and (ii) the movable gear held in meshing engagement with the connection gear, and
wherein the controller is configured to detect mesh between the one connection gear and the movable gear based on the reaction-force estimate value obtained by one of the at least one estimator which corresponds to the one mechanism.

* * * * *